Figure 1:
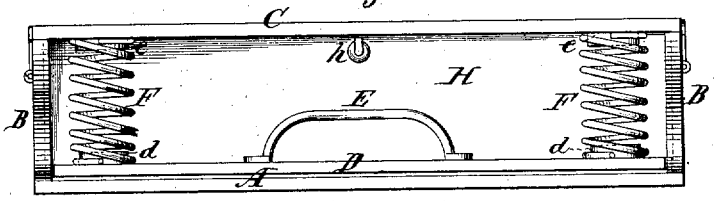

2 Sheets--Sheet 1.

W. A. AMBERG.

Paper-File.

No. 4,989. Reissued July 16, 1872.

Witnesses.
H. L. Penine
Jarvis Moulder.

Inventor:
William A. Amberg
by John J. Halsted
Attorney.

2 Sheets--Sheet 2.

W. A. AMBERG

Paper-File.

No. 4,989.

Reissued July 16, 1872.

*Witnesses.*
H. L. Perrine
Jarvis Moulden

*Inventor:*
William A. Amberg.
by John J. Halsted.
*Attorney.*

UNITED STATES PATENT OFFICE.

WILLIAM A. AMBERG, OF CHICAGO, ILLINOIS.

IMPROVEMENT IN PAPER-FILES.

Specification forming part of Letters Patent No. 92,141, dated July 6, 1869; reissue No. 4,989, dated July 16, 1872.

*To all whom it may concern:*

Be it known that I, WILLIAM A. AMBERG, of Chicago, in the county of Cook and State of Illinois, have invented a new and useful Index, Paper-Holder, File, and Binder; and I do hereby declare and make known that the following is a full, clear, and exact description of the same, reference being had to the accompanying drawing and to the letters and figures marked thereon, which form part of this specification.

My invention embraces a novel construction of index, and also a novel apparatus for receiving and holding not only such index, but the papers, &c., to be classified, preserved, and bound between its leaves. The index consists in a set of loose sheets of card-board or suitable stiff paper, as distinguished from the folded or doubled sheets of an ordinary indexed book; these loose non-folded sheets being severally marked with their appropriate letter of the alphabet, or with other suitable designating characters, the loose and separated condition of the leaves permitting the introduction between any two of them of any desired number of papers, letters, &c., whose edges may reach even with the back edges of the index-sheets, and yet permitting the whole to lie smooth and flat, however much the number of papers between any two sheets may exceed the number between any of the others. The apparatus consists in a device in and by which the letters, bills, or any other papers to be filed between such detached index-leaves may be firmly and securely held in place, and in which, when the device is filled, or when enough papers, bills, or letters shall have been filed therein to form a volume, they may be securely bound together, either with or without the index, as hereinafter set forth.

To enable those skilled in the art to understand how to construct and use my said invention, I will proceed to describe the same with particularity, making reference in so doing to the drawing, in which—

Figure 2:
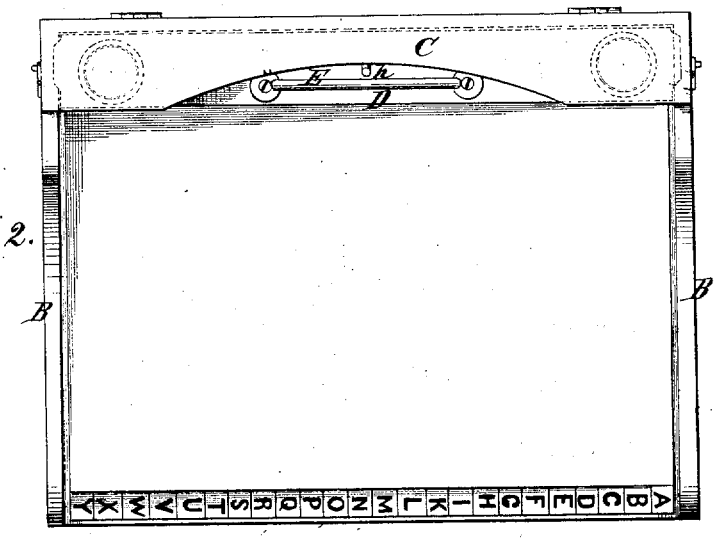
Figure 3:
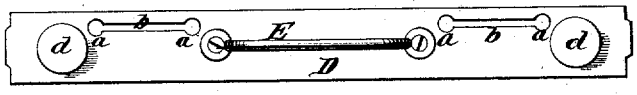
Figure 4:
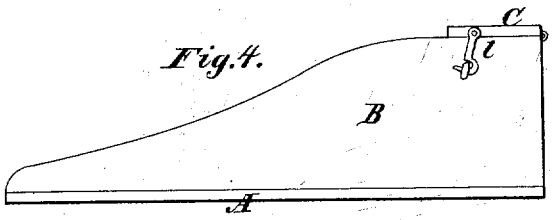
Figure 5:
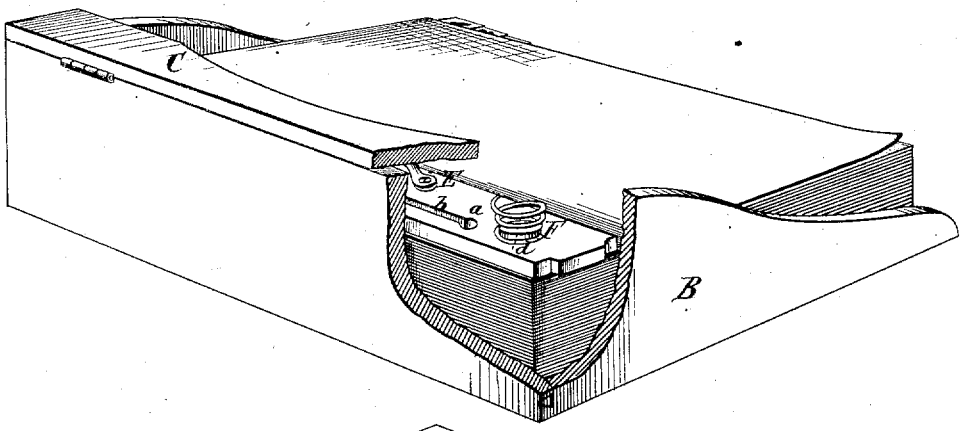
Figure 6:
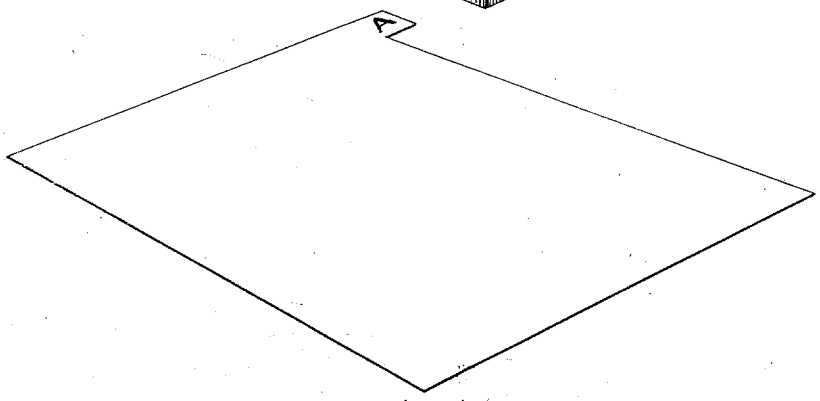

Figure 1 represents a front view or elevation of my invention. Fig. 2 is a plan or top view of the same. Fig. 3 is a top view of the pressing-bar, which holds the papers in place. Fig. 4 is a side view of said invention; Fig. 5, a perspective view, showing more clearly the construction and utility of the loose-leaved index; and Fig. 6, one of the loose sheets of such index.

A represents the bottom of the apparatus, which is provided with side pieces B B and the back H, as shown, the height of the back and that part of the sides adjacent to it being sufficient to allow the desired number of letters, bills, or other papers to be laid in the box, and below the top C of the same, this top being connected to the back by hinges, and secured in place by means of hasps or hooks *l*, as shown in the drawing. The width of the box is designed to be sufficient to permit ordinary letter-paper to be placed in sidewise, and half-note sheets to be in endwise, two on a page; but the dimensions of the box are immaterial, and it may be made of any desired size. Beneath the cover or top C is arranged a strip of wood or other material, marked D, upon the top of which, near each end, is a block, *d*, over which a spiral-coil spring is arranged, said blocks *d* serving to keep the springs in place, while the upper ends of said springs are retained in place by means of similar blocks *e* upon the under side of the top piece C, as shown. Instead of said springs, rubber or conically-coiled springs may be used, secured in position in any suitable manner. The said springs tend to press the bar D down upon whatever may be placed beneath it, and the bar is provided with a handle, whereby it may be raised up, which handle may be passed over a hook, *h*, and held up when desired. In said bar, and also in the bottom directly beneath, are slots *b b*, whose ends are formed with enlargements *a a*, for the purpose of facilitating the binding of the files contained in the holder, when desired, as hereinafter described. In the said box is a series of card-board or paper sheets, indexed, as shown, between which, under appropriate letters, the letters, bills, or other papers may be placed to facilitate reference thereto, when desired.

The papers are placed in the holder between the appropriate card-boards or paper sheets, one edge being firmly pressed up against the back piece H, and being otherwise adjusted, so as to present uniform and even edges, against the side pieces B. Thus the papers may be filed and held in place by means of the pressing-bar D until the holder is full, when the index-sheets may, if desired, be withdrawn and the entire contents of the file be bound together and removed ready for another set or series.

To bind the files, the hooks *l* are detached and the cover C thrown back upon its hinges, when perforations are made by passing an awl through the holes *a*, through which tapes or wires are passed and drawn down through the bottom and tied, the tapes passing through the slots *b*, when the bar D is removed, and the file, properly and securely bound, is taken out, as aforesaid.

Instead of the arrangement herein shown, the springs may be so arranged as to operate in connection with the side pieces B, in which case the cover or top C may be dispensed with; or said spring may operate against lugs formed upon the top of the back H or sides B, or both.

If preferred, the side pieces B B may be dispensed with, as the only service which they perform is to keep the edges of the letters or other papers filed even and straight.

Having described the construction and operation of my invention, I will specify what I claim and desire to secure by Letters Patent:

1. I claim the index, composed of a set of unfolded, disconnected, indexed sheets, substantially as shown and described.

2. I also claim, as a means for binding together the index and its interposed leaves, the removable clasping covers or strips provided with the slots, substantially as shown and described.

3. I also claim a paper-holder, file, and binder, when constructed and operating substantially as described, and in a convenient form for indexing and binding, substantially as set forth.

WILLIAM A. AMBERG.

Witnesses:
M. SCHWEISTHAL,
J. HENRY AMBERG.